US009924343B2

(12) United States Patent
Livezey, Jr.

(10) Patent No.: US 9,924,343 B2
(45) Date of Patent: Mar. 20, 2018

(54) BLE BEACON ADVERTISING A SEMANTIC LABEL AND IPV6 ADDRESS

(71) Applicant: Robert Lee Livezey, Jr., Fort Bragg, CA (US)

(72) Inventor: Robert Lee Livezey, Jr., Fort Bragg, CA (US)

(*) Notice: Subject to any disclaimer, the term of this patent is extended or adjusted under 35 U.S.C. 154(b) by 10 days.

(21) Appl. No.: 15/185,030

(22) Filed: Jun. 17, 2016

(65) Prior Publication Data
US 2016/0373918 A1     Dec. 22, 2016

Related U.S. Application Data

(60) Provisional application No. 62/180,980, filed on Jun. 17, 2015.

(51) Int. Cl.
*H04W 8/00*     (2009.01)
*H04W 4/00*     (2018.01)

(52) U.S. Cl.
CPC ........... *H04W 8/005* (2013.01); *H04W 4/008* (2013.01)

(58) Field of Classification Search
CPC .............................. H04W 4/008; H04W 8/005
See application file for complete search history.

(56) References Cited

U.S. PATENT DOCUMENTS

| | | | | |
|---|---|---|---|---|
| 7,880,613 B1* | 2/2011 | Maeng | ................. | G06K 7/0008 340/10.42 |
| 9,043,602 B1* | 5/2015 | Krieger | ................. | H04W 12/06 713/181 |
| 2005/0285742 A1* | 12/2005 | Charych | ................... | G01S 3/20 340/572.1 |
| 2008/0122622 A1* | 5/2008 | Archer | ................... | G06K 17/00 340/572.1 |
| 2008/0248781 A1* | 10/2008 | Cedo Perpinya | ...... | G06Q 30/02 455/412.1 |
| 2008/0301307 A1* | 12/2008 | Son | .................... | G06F 17/30876 709/228 |
| 2009/0106234 A1* | 4/2009 | Siedlecki | .......... | G06F 17/30864 |
| 2009/0175250 A1* | 7/2009 | Mathur | ................. | H04W 48/20 370/338 |
| 2014/0007156 A1* | 1/2014 | Navin | ..................... | H04L 63/10 725/32 |
| 2016/0029346 A1* | 1/2016 | Suresh | ................ | H04W 72/005 340/539.16 |
| 2016/0330772 A1* | 11/2016 | Hillier | ..................... | H04L 12/10 |

* cited by examiner

*Primary Examiner* — Yuwen Pan
*Assistant Examiner* — Fatuma Sherif

(57) ABSTRACT

A semantic signature serving as an index to a cataloged core semantic concept, and an IPv6 address associated with an entity labeled by a Bluetooth 4.0 Beacon are added to the Beacon's Generic Access Profile (GAP) advertisement enabling direct semantic discovery of the entity and facilitating data transactions relevant to it.

18 Claims, 8 Drawing Sheets

BLE BEACON ADVERTISING A SEMANTIC LABEL AND IPV6 ADDRESS

CLAIM OF PRIORITY UNDER 35 U.S.C. 119

The present application for patent claims priority to Provisional Application No. 62/180,980 entitled BLE BEACON ADVERTISING A SEMANTIC LABEL AND AGENT ADDRESS, filed Jun. 17, 2015 by the same inventor as the subject application and expressly incorporated by reference herein.

FIELD

Implementations related to semantic tagging and discovery of devices, objects and contexts by computational devices.

BACKGROUND

The rapid proliferation of low-cost wireless technology such as "Bluetooth Smart", and emerging market opportunities viewing everyday objects as "gateways to a service" is driving an explosion in the number of entities wirelessly advertising their presence that surround us.

In the near future we'll be immersed in these ambient data sources. In a public and mobile context, thousands of potentially valuable wireless data sources will be available as we go about our daily lives. Some with known services, but most from undiscovered sources. This world holds incredible potential but only if the few valued sources can be separated from all others without the overhead of interrogation, or the need to query a remote server.

Whether it's through sounds, scent, or optical patterns, individuals in our natural world depend on the ability to directly associate unique natural signatures to goal driven discovery. Nature, through millions of years of evolution, has determined this direct discovery is essential information technology for its ecosystems. Whether it's identifying a bird by its call, or recognizing a product by its logo, it's the way humans naturally interface with the world.

Unfortunately our internet technology didn't follow nature's example. Our global internet developed around remote clients and centralized servers. It depends on entities like Google for data discovery, and indirect linked data to decode any identifiers such as MAC addresses and UUID's. This indirection has worked well for decades, but as the Internet of Things (IoT), Moore's Law, IPv6 and mobile technology move us from 100's of enterprise provided services to millions of ambient ones we're reaching a crisis. Just like the natural world immerses us in the sights, sounds, and circumstances of living, our connected world will soon immerse us in ambient digital information. And just like in nature, our digital applications will need better ways to find, and filter, valuable information from the background noise of thousands of simultaneously available services.

This puts a premium on giving our digital world methods supporting direct-discovery using human natural language (semantic) association. This is especially true where internet connectivity is lacking, or in a mobile environment where low-powered services are only transiently available.

Personal, goal driven, software applications will need a means to discover objects and opportunities of interest to users. Video is rapidly emerging as one means to allow mobile computational intelligence to observe our physical world, but while video can be used to identify objects and some situations it's very limited when it comes to recognizing an object's state or real context. For example video allows a computational device to identify a dog, but it can't tell if the dog is a lost dog. Video can't see "behind the curtain". For example it can't see all the product offerings inside a store when the user is walking by outside.

The technology disclosed herein embeds a semantic signature and IPv6 agent address within a "Bluetooth Smart" GAP advertisement. This facilitates direct semantic discovery by any of the millions of Bluetooth 4.0 capable mobile computational devices. Even a coarse semantic filtering that allows an application to identify and disregard a substantial percentage of received advertisements as irrelevant to user goals offers significant benefits such as power savings and reduced bandwidth usage.

SUMMARY

According to one aspect of the invention, a method for provisioning a beacon advertisement with a semantic signature serving as an index to a cataloged core semantic concept is disclosed.

In accordance with another aspect of the invention, a method for provisioning a beacon advertisement with both a semantic signature serving as an index to a cataloged core semantic concept, and an IPv6 address associated with the entity labeled by the beacon enabling data transactions relevant to the semantically discoverable entity is disclosed.

In accordance with another aspect of the invention, a method for provisioning a Bluetooth 4.0 Generic Access Profile (GAP) advertisement with both a semantic signature serving as an index to a cataloged core semantic concept, and an IPv6 address associated with the entity labeled by the beacon enabling data transactions relevant to the semantically discoverable entity is disclosed.

In accordance with another aspect of the invention, a method which utilizes a natural language processing (NLP) computational application able to process human language inputs, associate these inputs with the core semantic concepts they represent, and retrieve the associated semantic signatures for application in a beacon advertisement is disclosed.

Above is a simplified Summary relating to one or more implementations described herein. As such, the Summary should not be considered an extensive overview relating to all contemplated aspects and/or implementations, nor should the Summary be regarded to identify key or critical elements relating to all contemplated aspects and/or implementations or to delineated the scope associated with any particular aspect and/or implementation. Accordingly, the Summary has the sole purpose of presenting certain concepts relating to one or more aspects and/or implementations relating to the mechanisms disclosed herein in a simplified form to precede the detailed description presented below.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

The scope of this disclosure is using digital technology to semantically label real world entities in such a manner as to make them directly discoverable to a computational device utilizing personal application software.

While the scope of this disclosure has broad application, the disclosed implementation presented herein utilizes low power Bluetooth, identified by the Bluetooth Special Interest Group (SIG) within the Bluetooth 4.0 specification as "Bluetooth Smart". The industry has adopted the shorthand reference of "BLE", and henceforth the term BLE will be used herein when referencing this standard.

BLE has seen rapid adoption in the form of "BLE Beacons" utilized to label physical objects and locations (E.g. merchandise and bus stops), provide a link to contextually useful information (E.g. Museum exhibits and navigation data for the blind or disabled). This has resulted in low cost hardware and a rapidly growing infrastructure capable of being enhanced by the technology disclosed herein.

Further, the maximum amount of data BLE is allowed to include in an advertising header is very limited. Thus it essentially serves as "the lowest common denominator" for a proof of concept of the technology disclosed herein.

Figure 1:
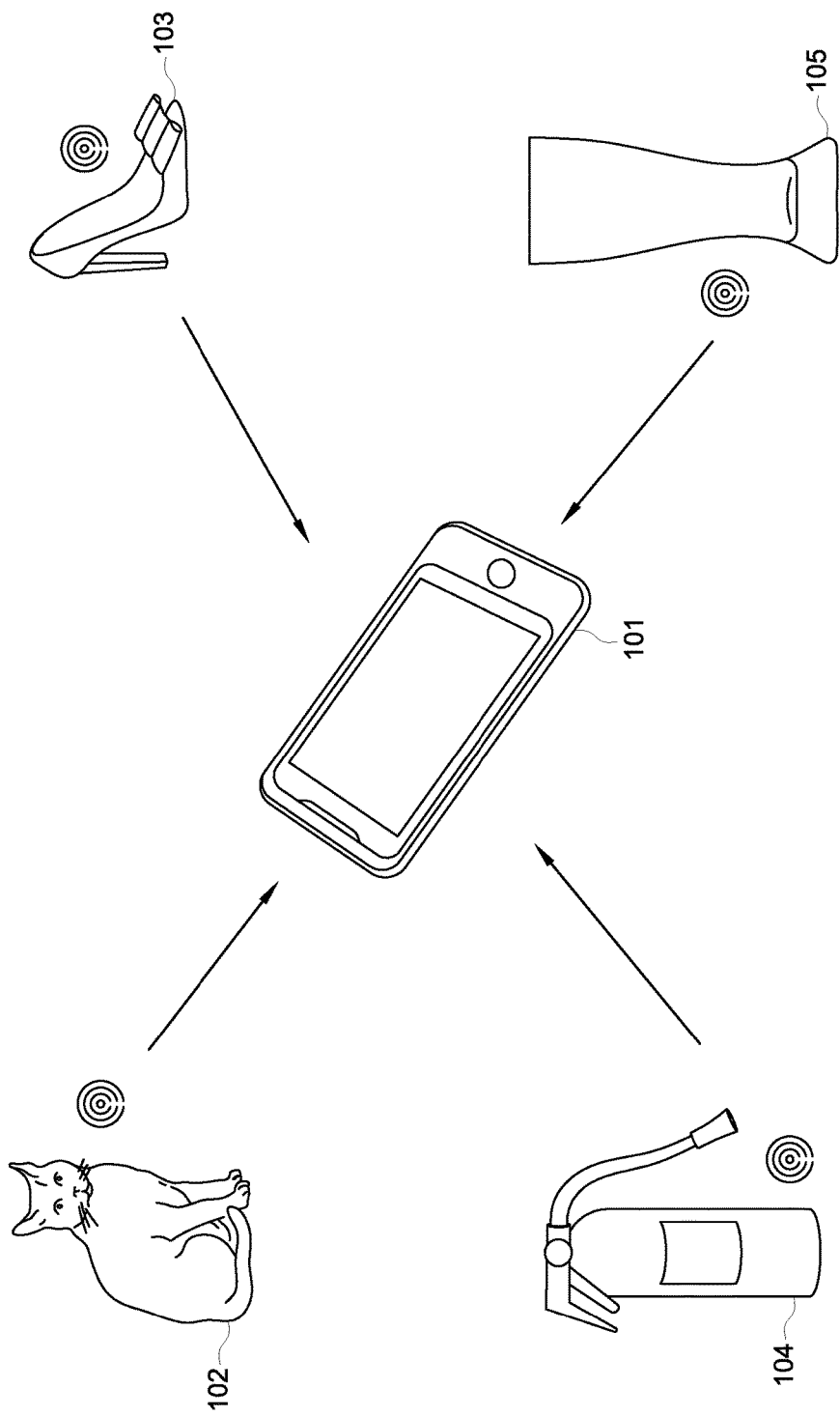
FIG. 1 illustrates an example of various physical objects affixed with some wireless identification technology such that said objects can be detected and identified by a computational device.

FIG. 1 illustrates the use of BLE Beacons today. A portable computational device, such as smartphone 101 is capable of receiving BLE advertisements broadcast by BLE Beacons 102 thru 105. Cat collar 102 may be used to identify this cat by broadcasting a numeric identification. Beacon 103 identifies the merchandise as a particular brand and style of shoes. The Beacon 104 provides a wireless means of providing a serial number for the fire extinguisher facilitating accessing its maintenance record. Beacon 105 is used to label a particular bar glass in an establishment to facilitate billing by the server.

As used today, the data contained in a Beacon advertisement has no direct relation to a semantic understanding of the entity or application it labels. In the case of merchandise, such as shoes 103, an application running on smartphone 101 may include the Universal Product Code (UPC) for a manufacturer A's "women's red pumps, style 123, size 7" but that UPC would have no direct meaning for another manufacturers practically identical shoes. In another use case, a Beacon advertisement may include an IPv6 link address, as is the case with Google's Eddystone project, allowing the user of smartphone 101 to jump directly to a web site or server to find information relevant to the labeled entity (E.g. the bus schedule associated with a bus stop). But, without prior knowledge, the Beacon advertisement is not directly, and semantically, discoverable as a bus stop.

Further, BLE Beacon technology as currently implemented has no direct provision for adaptation to ever changing context.

This disclosure describes a method for utilizing unique identifiers associated with human semantic concepts as a universally applicable semantic signature which, once stored in memory available to a software application, allows said software application to correlate any observed Beacon or network advertisement labeled with a semantic signature with the underlying human semantic concept associated with that semantic signature.

Figure 2:
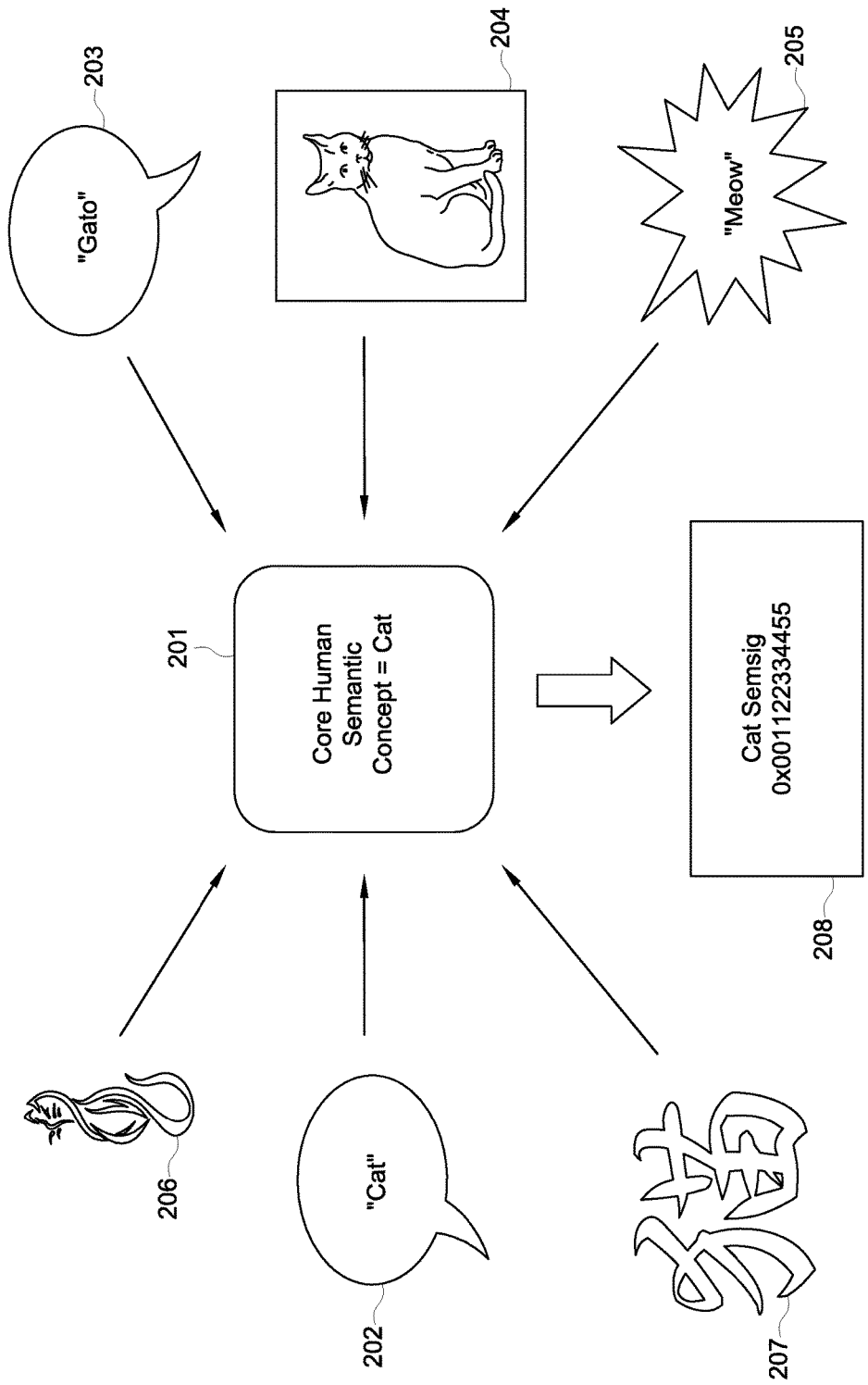
FIG. 2 illustrates the concept of associating human language and symbols used by humanity to communicate the underlying human semantic concept, and how that semantic concept can be assigned a unique numeric.

A semantic concept may be any human mental concept containing meaning about our world including, but not limited to, entities, events, abstractions, and experiences. FIG. 2 illustrates the concept using the simple example of the semantic concept "Cat" in block 201. Many different inputs, such as those labeled 202 through 207, can be used by humans to communicate the concept "Cat. The spoken English word "Cat" (202), or the Spanish equivalent "Gato" (203), a picture of a cat (204), the sound made by a cat (205), a stylized logo reminiscent of a cat (206) or an Asian character for cat (207) all translate to the core human semantic concept of cat (201), which can be assigned a unique numeric identifier, herein after referred to as a semantic signature or "Semsig" (208).

Because human semantic concepts are grounded in human experience they are inherently contextual. Consequently, labeling real world entities with a Beacon broadcasting a Semsig makes direct semantic discovery, and understanding of our proximate physical world, possible by computational devices capable of receiving that semantic Beacon and running application software able to interpret it.

Figure 3:
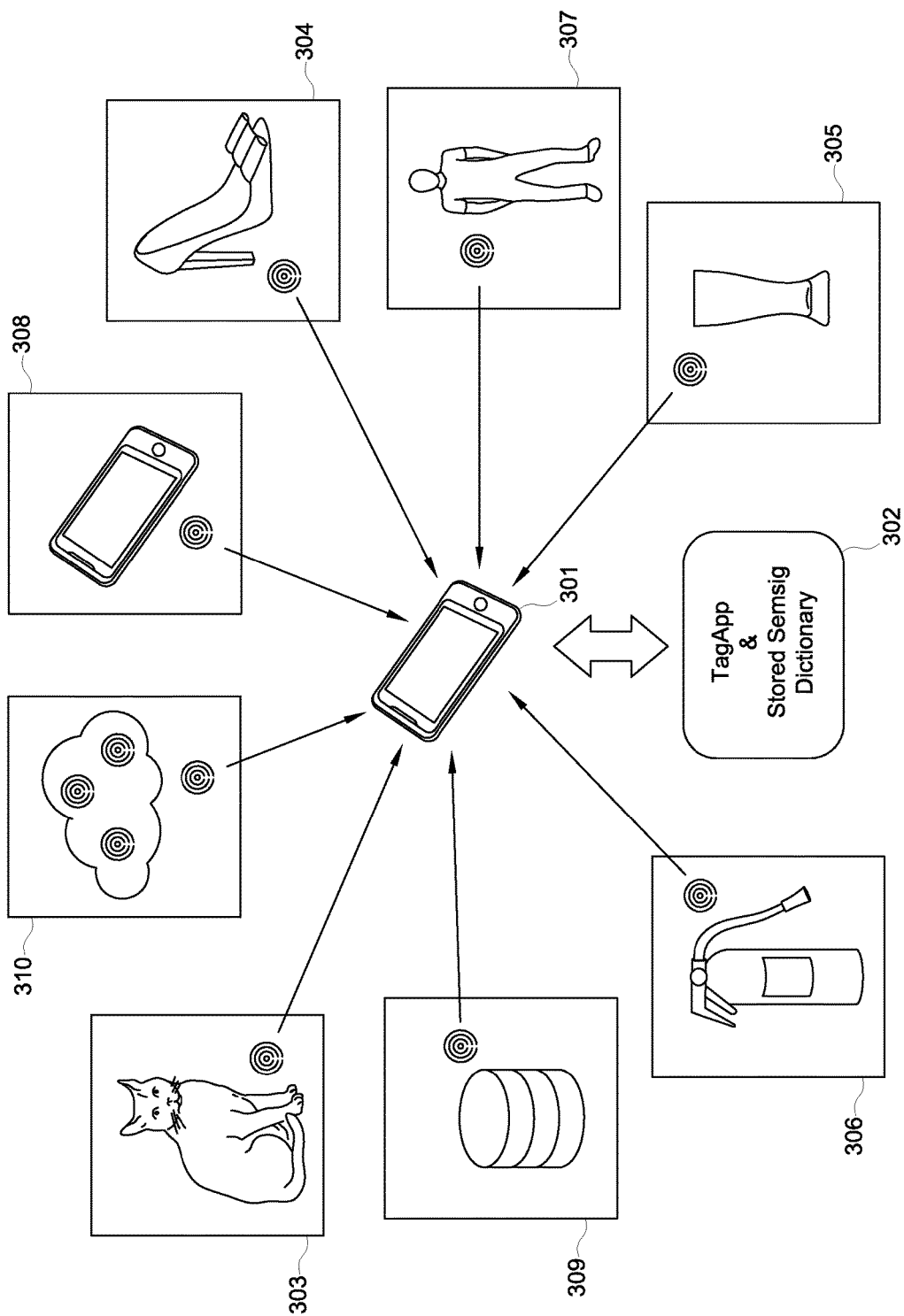
FIG. 3 illustrates the concept of direct discovery of entities and their context based on their advertised semantic signature.

FIG. 3 illustrates this concept. Utilizing the technology disclosed herein entities 303 through 310 are labeled with Beacons broadcasting BLE Semsig advertisements, herein after referred to as "Tags". Smartphone 301 is running application software (302), herein after referred to as a "TagApp" that compares the Semsig label received from a Tag against a repository of stored Semsigs available to the TagApp because of the value of the associated semantic concepts to the goals of the TagApp's user. Given the contextual nature of Semsigs each of the example Tags is capable of providing much richer information and insight then today's BLE Beacons or an AI interpreting a video image. Cat 303 can be understood to be not just a cat, but a "lost cat—please report". Merchandise 304 can be understood to be "women's red pumps, in a particular style, size 7, and on sale" using the same Semsig irrespective of the manufacturer. Beer glass 305 can easily be understood to have last contained a particular beverage and now needs a refill. Fire extinguisher 306 can easily change its Semsig to "requires maintenance" when its pressure drops. Semsigs can be associated with any human semantic context. For example, 307 is used to identify a particular social opportunity. The user of phone 308 is using its BLE hardware to broadcast a Semsig soliciting a ride within a group of patrons at an establishment. The TagApp (302) can recognize what data is available from data source 309. Finally, a semantic concept can be based on a collaboration of and/or a hierarchy of Tag labeled entities or services which can be represented in aggregate by a new Semsig as shown by 310.

The utility of a Semsig such as 208 in FIG. 2 is predicated on its ability to provide a unique numeric index to a specific core human semantic concept (201) which is universally agreed by all users to be the accepted Semsig for that semantic concept. This requires establishment of a master dictionary of semantic concepts, each of which are indexed with a master semantic signature from which, either directly or indirectly, the Semsigs used in the technology disclosed herein can be derived. This central registry, which will be established, maintained, and published by an administrative group or organization, is referred to herein as the Master Semantic Registry ("MSR").

A plurality of human natural language inputs, such as those illustrated by 202 thru 207 in FIG. 2, have to be resolved to the Semsig assigned as the index for the specific associated semantic conceptual description cataloged in the MSR which is most representative of the semantic concept communicated by these natural language inputs. The preferred implementation disclosed herein is the use of that area of Deep Learning and Cognitive Computing know as Natural Language Processing (NLP).

As demonstrated by the ever increasing power of NLP applications such as Amazon's Alexa, Apple's Siri, and IBM's Watson to disambiguate and decode human natural language presented as either speech or text, and link that natural language input to the relevant data; e.g. images of cats, or weather data for a requested city, individuals skilled in the art of cognitive computing and NLP can apply this technology to associate human natural language requests to a universally agreed numeric label, herein referred to as a Semsig, curated in a Master Semantic Registry.

Figure 4:
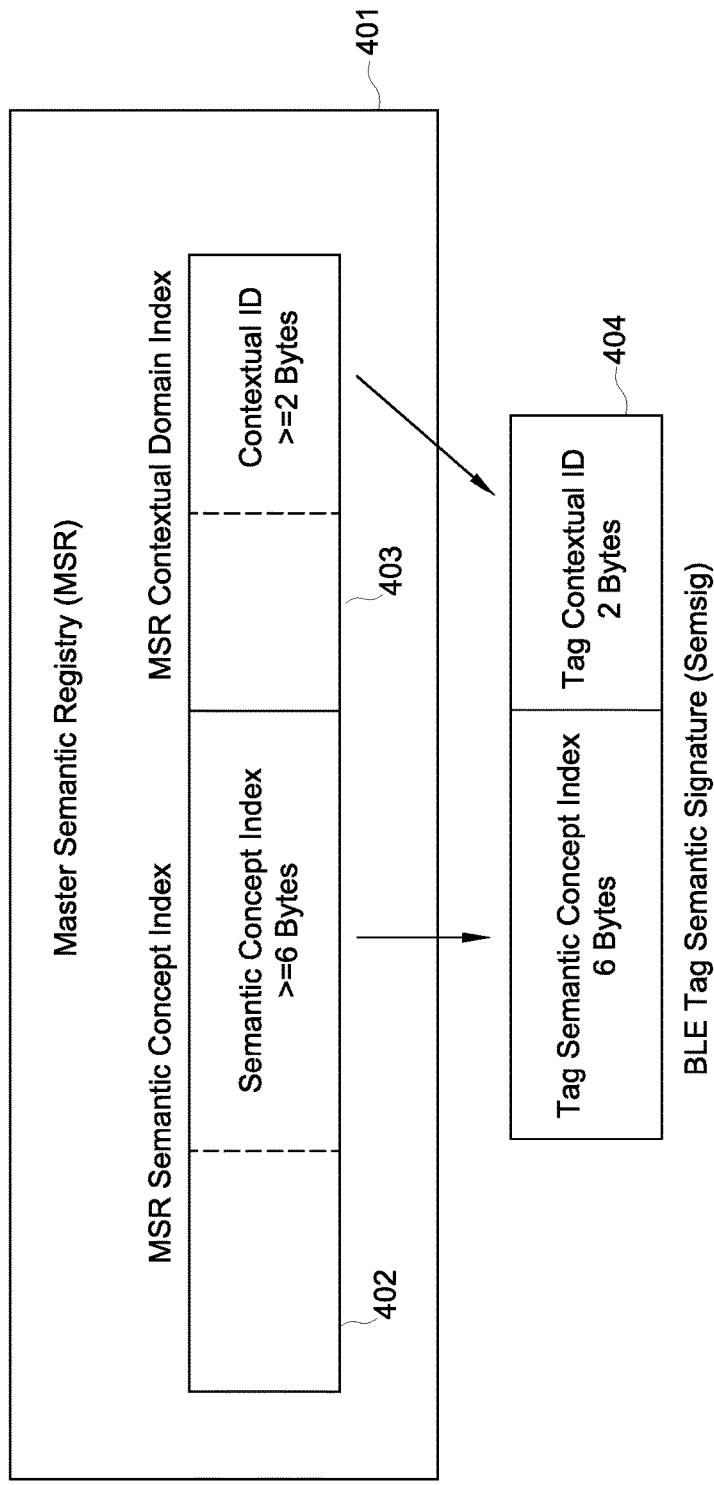
FIG. 4 illustrates a preferred implementation of a Master Semantic Registry entry and the derived format utilized as the BLE Tag semantic signature.

FIG. 4 illustrates one implementation of an MSR entry (401) and the derived Semsig (404), which must be constrained to 8 bytes when used as the semantic label in a BLE Tag advertisement. As described above, MSR 401 is associated with a core semantic concept, such as 201 in FIG. 2.

As discussed above and illustrated in FIG. 3, semantic concepts are naturally contextual. Each MSR semantic concept can discretely represent a particular context, for example "cat" and "lost cat" would be totally separate. An alternate approach defines contextual domains within which semantic concepts can be grouped. For example, the semantic concept "cat" could be placed within the contextual domain of "lost". The implementation disclosed herein illustrates the use of contextual domains. Referring to FIG. 4, MSR 401 contains both a Semantic Concept Index (402), which is the unique numeric index to the defined specific core human semantic concept, and a Contextual Domain Index (403) which is a numeric index to a semantic contextual definition, for example "lost", maintained in the Master Semantic Registry.

Accommodating contextual domains allows immediate adoption of existing categorical references, for example the Universal Product Code (UPC) and the Standard Industrial Classification (SIC) registries, by assigning them a contextual ID and treating their member codes as semantic concepts identifiable with a readily assigned Semsig.

While the implementation disclosed herein utilizes contextual domains it will be understood by a skilled artisan that one or more alternate implementations of a Master Semantic Registry can be utilized without benefit of contextual domains and remain within the scope of this disclosure.

As detailed below, and in FIG. 5, the Semsig derived from the MSR and applied to a BLE Tag, as disclosed herein, is constrained by the limits imposed by the Bluetooth Special Interest Group (SIG) Bluetooth 4.0 specification to a length of 8 bytes. Referring to FIG. 4, the BLE Tag Semsig (404) derived from the MSR (401) utilizes the 2 low order bytes from the MSR Contextual Domain Index (403) as the low-order bytes of Semsig 404, and the 6 low-order bytes from the MSR Semantic Concept Index (402) as the upper 6 bytes of the Semsig 404.

As disclosed herein and illustrated in FIG. 4, 8 byte BLE Tag Semsig 404 is interpreted as two parts, a) the lower-order 2 byte Contextual ID as a 16 bit numeric index identifying one of a possible 65,536 discrete contextual domains, and b) the higher-order 6 byte Semantic Concept Index as a 48 bit numeric index identifying one of over $2.81 \times 10^{14}$ possible unique semantic concepts within each of these 65,536 possible contextual domains.

Figure 5:
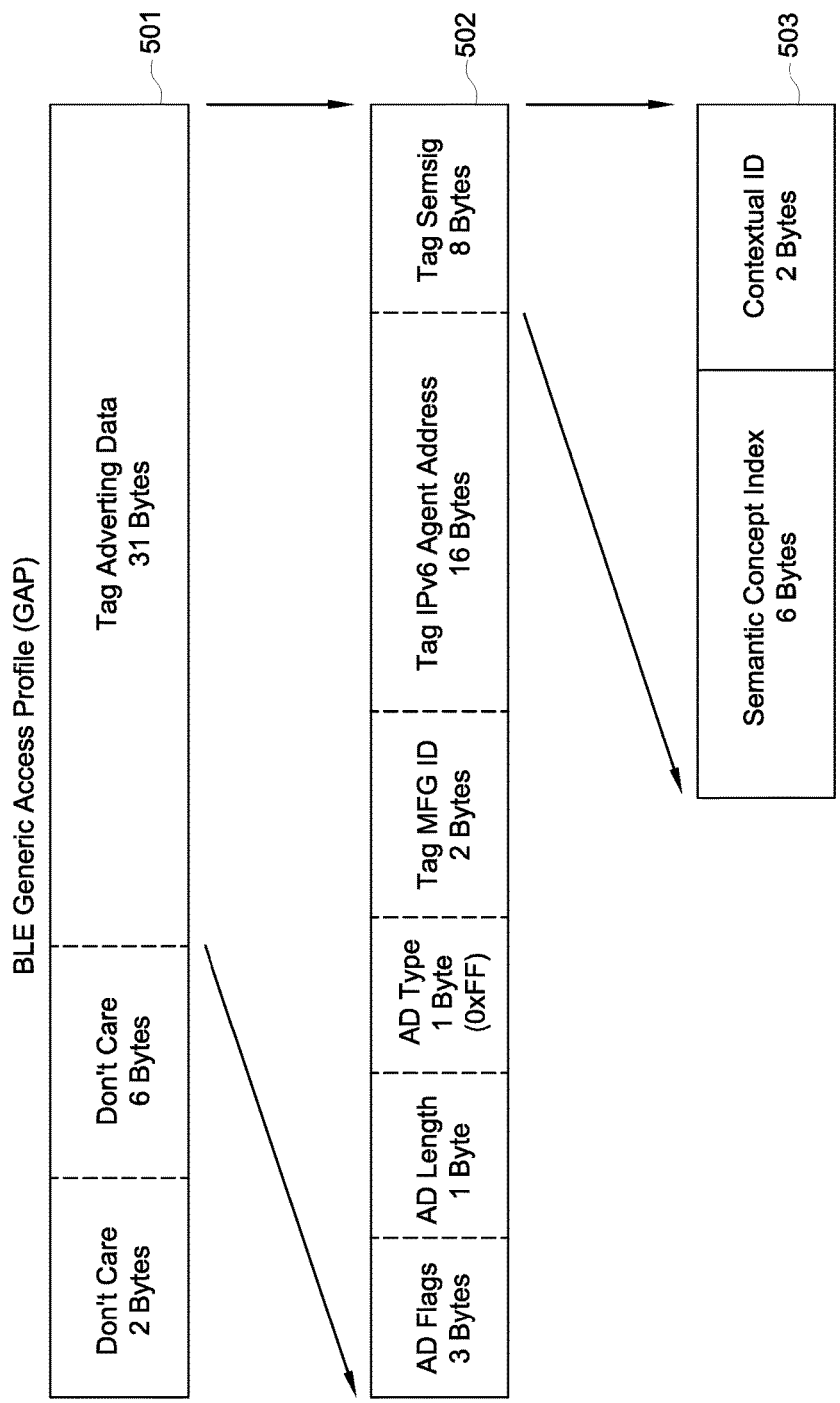
FIG. 5 illustrates the Bluetooth Special Interest Group Bluetooth 4.0 Generic Access Profile (GAP) format used by this disclosure to broadcast both a semantic signature (Semsig) and an associated IPv6 Agent Address in the GAP Advertising Data.

As disclosed herein, and illustrated in FIG. 5, while the BLE Tag Semsig (503) is constrained to a length of 8 bytes, there is no reason why the MSR entry (401) has to be so limited. It will be understood be a skilled artisan that the technology disclosed herein may be applied to other network technologies, for example 802.11, which are able to accommodate a Semsig comprising a length greater than 8 bytes, and still remain within the scope of this invention.

The Bluetooth Special Interest Group (SIG) Bluetooth 4.0 specification defines an advertising protocol known as the Generic Access Profile (GAP) which is utilized by the implementation disclosed herein. Referring to FIG. 5, GAP 501 broadcast by a Tag uses the maximum allowed GAP length of 39 bytes. Within 501 a total of 31 bytes are available for use by the Tag Advertising Data (502) after subtracting the required overhead mandated by the SIG BLE GAP protocol. Of the 31 bytes in 502, 26 bytes are utilized by the technology disclosed herein after subtracting the required Advertising Data (AD) flags, length and data type bytes mandated by the SIG BLE GAP protocol. As illustrated, the value of the Advertising Data Type byte in 502 is 0xFF, which is specified by the SIG GAP protocol to indicate the following data is manufacturer data.

As illustrated in 502, the implementation disclosed herein uses the 2 byte manufacturer identification to notify recipients this GAP is a semantic Tag advertisement. Of the remaining 24 bytes the lower 8 bytes are assigned to the Tag Semsig (503) discussed above, while the upper 16 bytes are reserved for a Tag IPv6 Agent Address.

Referring to illustration 502 the implementation disclosed herein provides for coupling a Tag IPv6 Agent Address with the Tag Semsig broadcast in the BLE Tag GAP. Coupling an IPv6 agent address with a Semsig binds a single semantically identifiable locus of information with a dedicated means to take action relevant to that discoverable semantic information, or enable a BLE connection from the user device to the Tag.

In accordance with the implementation disclosed herein the coupling of a Tag Semsig with a Tag IPv6 Agent Address can be utilized to access additional information about the discovered Tag from a remote source or authority. An example would be getting detailed information about sensors or other hardware in a Tag.

Further, as disclosed herein, the coupling of a Tag Semsig with a Tag IPv6 Agent Address can be utilized to access additional information about a physical object, entity, or service labeled by, and associated with, the discovered Tag. An example would be accessing rates and dates of availability for a Tagged automobile available for lease.

Further, as disclosed herein, the coupling of a Tag Semsig with a Tag IPv6 Agent Address can be utilized to access additional data about a physical location or context labeled by, and associated with, the Tag. An example would be acquiring museum navigation data for the blind relative to a Tagged kiosk.

Further, as disclosed herein, the coupling of a Tag Semsig with a Tag IPv6 Agent Address can be utilized to enable a transaction appropriate for the Tag device, labeled commodity or object, or an associated service. Examples include purchasing Tagged merchandise, or renting a Tagged automobile.

Further, as disclosed herein, the coupling of a Tag Semsig with a Tag IPv6 Agent Address can be utilized to enable, or participate in, a social activity using Tags or Tag compatible technology to identify members, aspects, or other elements useful to the activity, in concert with a reporting or coordinating authority accessible utilizing one or more IPv6 Agent Addresses.

As disclosed herein and illustrated in FIG. 7 discussed below, Semsigs are adaptive. A Tag can, and often will, change the Semsig it advertises based on a change of context or use case. In accordance with one or more aspects of the technology disclosed herein the coupling of a Tag Semsig with a Tag IPv6 Agent Address provides a mechanism that can be utilized to update the Tag Semsig and/or Tag IPv6 Agent Address as required by utilizing the Tag IPv6 Agent Address to provide access to the relevant authority, data source, or other entity empowered to administer that change. For example: when a product available for rent has been leased and its state changes from "available now" to "available in the future".

Further, as disclosed herein, the coupling of a Tag Semsig with a Tag IPv6 Agent Address can be utilized to enable a BLE GATT connection between a user device and the Tag.

Figure 8:
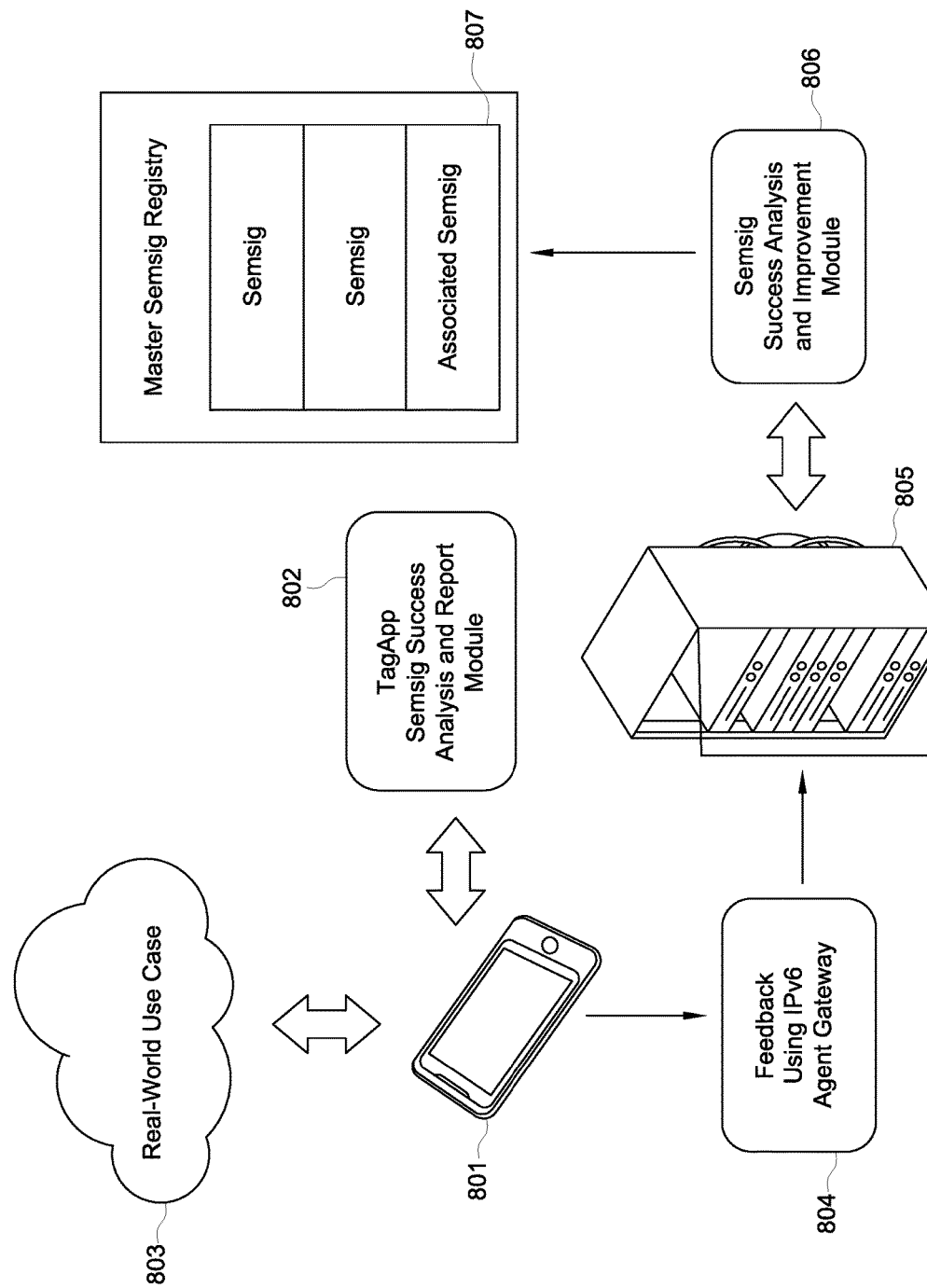
FIG. 8 illustrates the concept of utilizing the technology disclosed herein as a means to provide situational feedback for learning re-enforcement of the natural language processing computational environment responsible for associating human natural language inputs with semantic signatures.

In accordance with one or more aspects of the disclosure herein, and as illustrated in FIG. 8 discussed below, the coupling of a Tag Semsig with a Tag IPv6 Agent Address can be utilized to provide a feedback path enabling situational learning re-enforcement by the NLP computational application providing translation services of human semantic inputs, such as those illustrated in FIG. 6 by 602 through 604, and the associated MSR Semantic Concept Index entry (402) in FIG. 4.

The above uses enabled by the coupling of a Tag Semsig with a Tag IPv6 Agent Address as disclosed herein, while representative of the possibilities, are not intended to be construed as representing all possibilities.

While the disclosure above references the terms "Tag Semsigs" and "Tag IPv6 Agent Address", it should be noted that skilled artisans can apply the technology disclosed herein to other communication technologies, and utilize other data formats, without departing from the scope of the disclosure as defined by the appended claims.

While the technology disclosed and illustrated herein is most often presented in the singular it will be understood by a skilled artisan that a single BLE hardware device can broadcast multiple GAP Advertisements.

In accordance with one or more aspects of the disclosure herein, a single Tag may advertise a plurality of semantic Tag GAPs as may be dictated by the Tag hardware capabilities, and/or a given context or use case.

Additionally, in accordance with one or more aspects of the disclosure herein, a single Tag may advertise a plurality of GAPs one or more of which may utilize a GAP format other than that disclosed herein, and one or more of which may utilize the semantic Tag GAP disclosed herein, as may be dictated by the device hardware capabilities and/or a given context or use case.

Additionally, in accordance with one or more aspects of the disclosure herein, a plurality of Tags may advertise a plurality of semantic Tag GAPs all of which share a common Tag IPv6 Agent Address, as may be appropriate for a given context or use case.

As disclosed herein, Semsigs are uniquely associated with the core human semantic concept, as illustrated in FIG. 2. Semsigs allow the TagApp agent software utilizing them to "learn once and apply everywhere". The Semsig for a "lost dog" can be applied to any lost dog. This innate property of a semantic concept, and thus the associated Semsig, is very powerful. It allows functional substitution on the part of the TagApp, for example recognizing many different sources of "air temperature data" and being able to utilize whichever is most appropriate given cost and/or proximity.

However, a TagApp must "learn" a desirable Semsig by adding that Semsig to the stored repository of valued Semsigs it utilizes to compare against Semsigs received from Tags. Herein after, this stored repository of Semsigs will be referred to as the TagApp's "Semsig Dictionary".

In one implementation Semsigs could be manually entered into the TagApp's Semsig Dictionary.

In another implementation Semsigs can be added to the TagApp's Semsig Dictionary by copying a data structure comprised of one or more desired Semsigs from one data storage device to another using any medium capable of data transfer including, but not limited to, BLE, NFC, and Wi-Fi.

Figure 6:
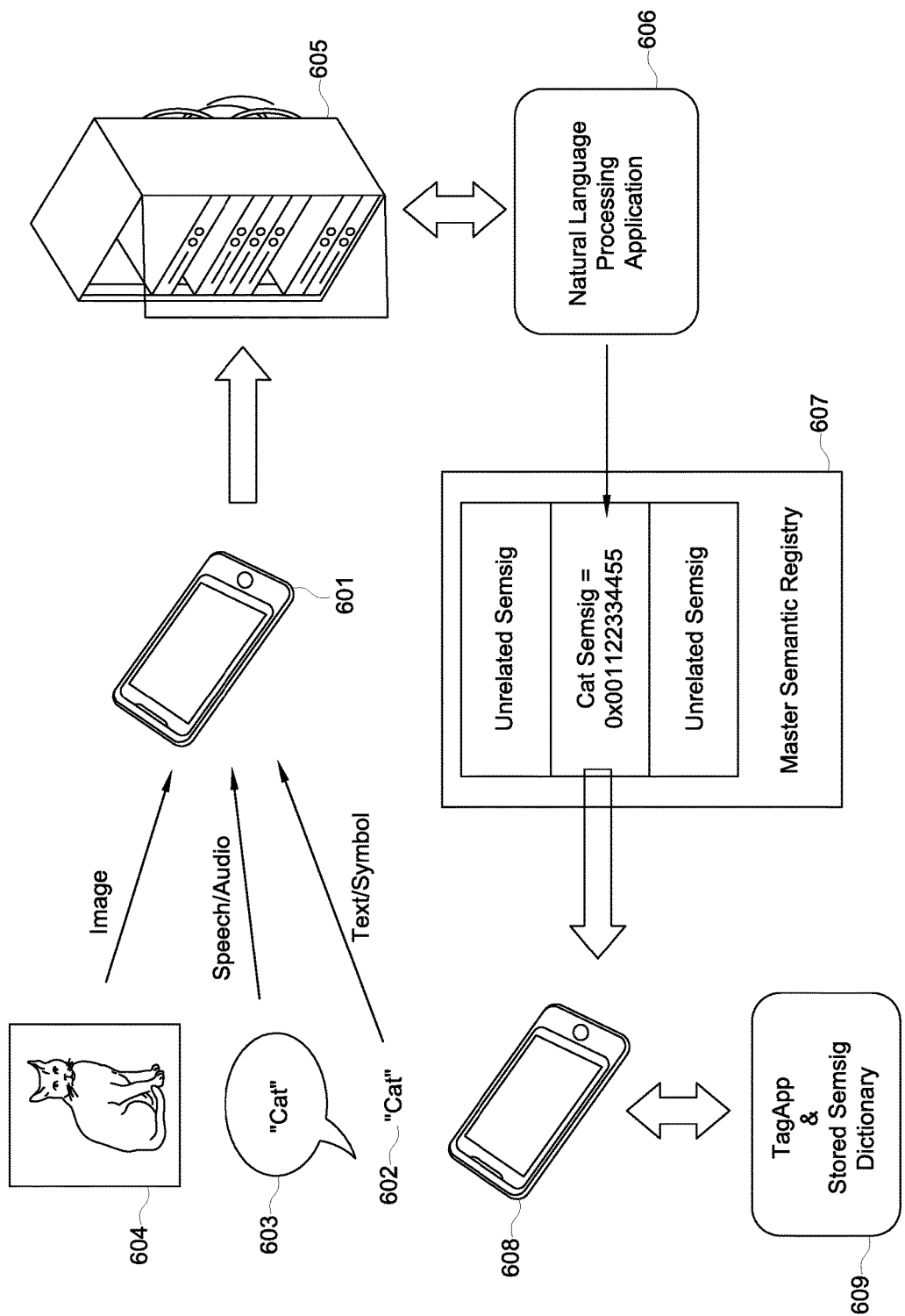
FIG. 6 illustrates the concept of utilizing Natural Language Processing in a cognitive computing environment to translate human language speech and/or symbols into the underlying core human semantic concept, map said core human semantic concept to the assigned Semsig in the Master Semantic Registry, and communicate said Semsig to a computational device for addition to the Semsig dictionary utilized by said device.

In the implementation illustrated in FIG. 6, natural language processing (NLP) is used to translate human language inputs such as speech or text and return the corresponding Semsig to the appropriate Semsig Dictionary. Referring to FIG. 6, user computational device 601 digitizes user inputs such as the text "cat" (602), or the audio from the spoken word "Cat" (603), or the image of a cat (604) and transmits the resulting representative data over the internet, or other available communications medium, to computational environment 605 which is running natural language processing application 606. NLP application 606 processes the digitized human semantic language input (602, 603 or 604) as required for the decoding, semantic disambiguation and translation of that input to the appropriate "Cat Semsig" entry within Master Semantic Registry 607. The "Cat Semsig" value (0x001122334455) is then communicated back over the internet, or other available communications medium, to the desired recipient user computational device 608 where TagApp 609 adds that Semsig to its Semsig Dictionary. A skilled artisan understands that device 608 can be the same device as device 601, or another device, or a plurality of devices as required for the specific use case.

In accordance with one or more aspects of the disclosure herein, the semantic Tag can be utilized in one of several ways.

Figure 7:
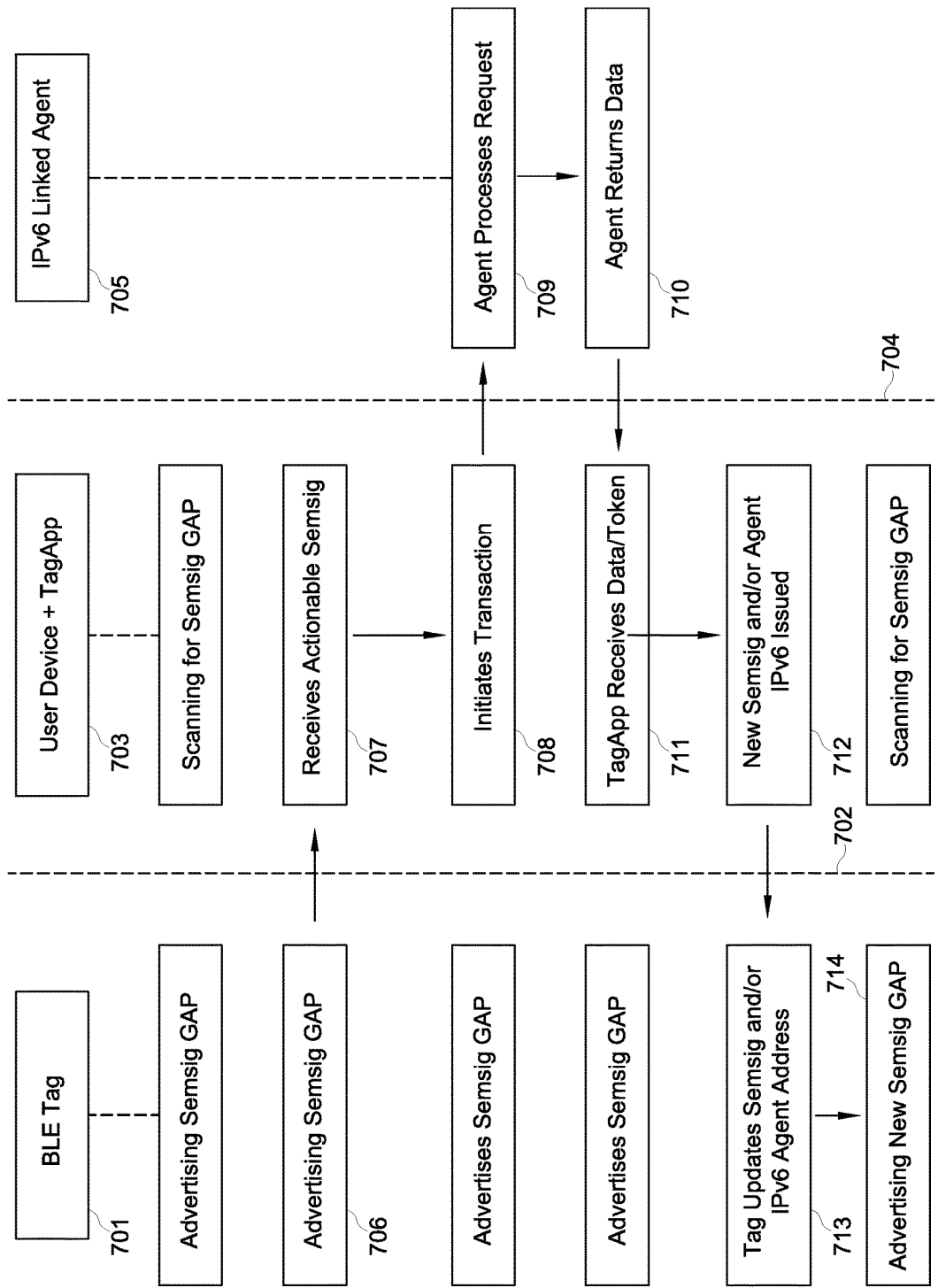
FIG. 7 illustrates a high-level diagram of a typical discovery and transaction sequence of the technology described herein.

Referring to FIG. 7 Tag 701 is associated with, and advertising a semantic identity for, some entity or service by periodically broadcasting Advertising Semsig GAPs over the air gap (702) between 701 and 703. User Device 703 includes hardware capable of receiving BLE GAPs. A TagApp software application running on Device 703 compares every received Semsig against a resident Semsig Dictionary initiates appropriate action should a match occur. User device 703 also has access to a network connection such that it is able to connect with IPv6 addressable Linked Agent 705 over the network medium 704.

In one or more implementations of the technology disclosed herein, a use case may be served merely by the discovery of a valued Semsig. For example, referring to FIG. 7, Tag 701 is periodically broadcasting Semsig GAPs and User Device 703 is scanning for Semsig GAPs. When Device 703 comes into range of Tag 701 the particular Semsig GAP 706 is Received by Device 703. The TagApp running on 703 compares the Semsig contained in the received Semsig GAP (707) against a collection of valued and/or actionable Semsig values stored in the TagApp's Semsig Dictionary. When a match is found between the Semsig in GAP 707 and a stored Semsig the use case associated with that Semsig requires no more action then awareness of the entity or service associated with Tag 701. An example would be alerting the user of Device 703 when a buying opportunity for specific merchandise was discovered.

In one or more implementations of the technology disclosed herein, a use case may require a user device connect with the BLE hardware utilized in the Tag. For example, referring to FIG. 7, Tag 701 is periodically broadcasting Semsig GAPs and User Device 703 is scanning for Semsig GAPs. When Device 703 comes into range of Tag 701 the particular Semsig GAP 706 is Received by Device 703. The TagApp running on 703 compares the Semsig contained in the received Semsig GAP (707) against a collection of valued and/or actionable Semsig values stored in the TagApp's Semsig Dictionary. When a match is found between the Semsig in GAP 707 and a stored Semsig the use case associated with that Semsig requires the BLE hardware in User Device 703 connect with the BLE hardware in Tag 701. In this use case the 16 byte Tag IPv6 Agent Address contained in Semsig GAP 707 provides the required information, as indicated by the Semsig contained in 707, required for User Device 703 to initiate a standard BLE GATT data connection, the details of which are understood by a skilled artisan. An example of such a use case would be when Tag 701 is required to log information contained in User Device 703.

In one or more implementations of the technology disclosed herein, a use case may require a user device connect with a remote agent providing information or a service associated with the discovered Tag. For example, referring to FIG. 7, Tag 701 is periodically broadcasting Semsig GAPs and User Device 703 is scanning for Semsig GAPs. When Device 703 comes into range of Tag 701 the particular Semsig GAP 706 is Received by Device 703. The TagApp running on 703 compares the Semsig contained in the received Semsig GAP (707) against a collection of valued and/or actionable Semsig values stored in the TagApp's Semsig Dictionary. When a match is found between the Semsig in GAP 707 and a stored Semsig the use case associated with that Semsig requires User Device 703 initiate a connection with IPv6 Linked Agent 705 whose address is contained Semsig GAP 707. The TagApp initiates a Transaction (708) which sends a request over the internet (704) to Agent 705. Agent 705 processes the request (709) and, based on the nature of the transaction, returns the data (710) required by the TagApp. The TagApp receives the data (711). In many use cases the reception of the requested data by the TagApp (711) is all that is required by the use case. In many other use cases further action may be required as discussed below.

One or more use cases of the implementations disclosed above may require BLE Tag 701 to change the Semsig and/or IPv6 Agent Address contained in future advertisements. Examples may include when a new Tag is put into service, or when labeled merchandise is sold. This is illustrated in FIG. 7. Utilizing the BLE hardware in User Device 703 the TagApp initiates a BLE GATT connection with the Tag. the new Semsig and/or IPv6 Agent address (712) are sent to the Tag which updates the Semsig and/or IPv6 Agent Address (713). Herein after the advertised Semsig GAP (714) will contain the update information of 713.

In one or more use cases of the implementations disclosed herein Tag 701 may change the Semsig and/or IPv6 Agent Address contained in future advertisements based on changes of context or use case Tag 701 can sense, or is directly responsible for. In this case Tag 701 updates the Semsig and/or IPv6 Agent Address (713) without any intervention from User Device 703 or IPv6 Agent 705. Herein after the advertised Semsig GAP (714) will contain the update information of 713. An example may include a dog collar affixed with a Tag capable of detecting when the dog leaves its yard, and upon said event changing the Semsig context to "lost dog".

In accordance with one or more aspects of the disclosure herein, and as illustrated in FIG. 8, the coupling of a Tag Semsig with a Tag IPv6 Agent Address can enable a means for situational learning re-enforcement for the Natural Language Processing application translating human semantic inputs into Semsigs.

Referring to FIG. 8 the TagApp running on user device 801 has been provisioned with a Semsig Success Analysis and Report Module (802) allowing it to provide a metric of success for the application of a Semsig in one or more real-world use cases (803). One or more Semsig plus IPv6 Agent Address pairings, which may be acquired within the Tag GAP received from outside Tagged entities in 803, and/or provided within success module 802, are designed to facilitate returning the measure of success or failure for a given Semsig used in a particular application. TagApp 802 prepares the report and uses the data connection of user device 801 to forward the report data to the NLP computational engine 805 via the IPv6 addressed Feedback Agent gateway (804). Upon receipt of the report data by computational engine 805 the report data is routed to the Semsig Success and Improvement module 806 which, based on the information received can improve the semantic translation associated with the target Semsig in the MSR (807).

Various aspects are disclosed in the following description and related drawings to show specific examples relating to example implementations of the technology disclosed herein. Alternative implementations will be apparent to those skilled in the pertinent art upon reading this disclosure, and may be constructed and practiced without departing from the scope or spirit of the disclosure. Additionally, well-known elements will not be described in detail or may be omitted so as not to obscure the relevant details of the aspects and implementations disclosed herein.

The word "exemplary" is used herein to mean "serving as an example, instance or illustration." Any implementation described herein as "exemplary" is not necessarily to be construed as preferred or advantageous over other implementations. Likewise, the term "implementations" does not require that all implementations include the discussed feature, advantage, or mode of operation.

The word "entity" as used herein is not necessarily to be construed as a physical entity. As used herein "entity" can also represent any identifiable construct considered to exist.

The word "signature" is used herein to mean "serving as an index, label, instance or illustration."

The term "human natural language" or "natural language" is used herein to represent the broad scope of possible sights, sounds, symbols, derived from that natural world and which humans may reference or utilize to communicate semantic ideas.

The terminology used herein describes particular implementations only and should not be construed to limit any implementations disclosed herein. As used herein, the singular forms "a", "an", and "the" are intended to include the plural forms as well, unless the context clearly indicates otherwise. It will be further understood that the terms "comprises," comprising, "includes," and/or "including," when used herein, specify the presence or addition of one or more features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g. an application specific integrated circuit (ASIC)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

While the foregoing disclosure shows illustrative aspects of the disclosure, it should be noted that various changes and modifications could be made herein without departing from the scope of the disclosure as defined by the appended claims. The function, steps, and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A wireless beacon method comprising:
provisioning a beacon with a semantic signature derived from a universal registry of semantic signatures which serve as indices to cataloged core semantic concepts, wherein the semantic signature utilized with said beacon represents a semantic concept intended to be associated with an entity labeled by said beacon;
periodic broadcasting of a beacon advertisement containing information including said semantic signature associated with said entity labeled by said beacon, wherein said beacon advertisement also includes an indication said beacon advertisement is of a type that includes said semantic signature;
reception at a computing device of a beacon advertisement indicating the presence of an entity labeled by said beacon wherein said beacon advertisement contains information including a semantic signature associated with the entity labeled by said beacon, and wherein said beacon advertisement also includes an indication said beacon advertisement is of a type that includes said semantic signature;
interpretation by application software running on, or available to, said computing device that the received beacon advertisement is of a type whose information includes a semantic signature associated with the entity labeled by said beacon;
in response to said application software interpreting that the received beacon advertisement is of a type whose information includes a semantic signature associated with the entity labeled by said beacon, said application software compares said semantic signature included in said received beacon advertisement against said application software's dictionary of stored semantic signatures representing semantically defined concepts or entities previously determined to enable desired actions when an entity identified as being semantically equivalent, by virtue of sharing the same semantic signature, is discovered to be available to the user and/or computational device utilizing said application software.

2. The method of claim 1 wherein the semantic signature also incorporates a contextual index.

3. The method of claim 1 wherein the semantic signature may be changed reflecting a change of the state, context, or associated semantic concept of said entity.

4. The method of claim 1 wherein the labeled entity is intended to represent a plurality of entities.

5. The method of claim 1 wherein said beacon can broadcast a plurality of advertisements, one or more of which include a semantic signature and one or more of which may utilize some other standard beacon advertising protocol.

6. The method of claim 1 wherein the beacon advertisement utilizes the Bluetooth Special Interest Group (SIG) Bluetooth Low Energy Generic Access Profile (GAP) protocol.

7. A wireless beacon method comprising:
provisioning a beacon with a semantic signature derived from a universal registry of semantic signatures which serve as indices to cataloged core semantic concepts, wherein the semantic signature utilized with said beacon represents a semantic concept intended to be associated with an entity labeled by said beacon;

periodic broadcasting of a beacon advertisement containing information including both said semantic signature associated with said entity labeled by said beacon, and an IPv6 address assigned to facilitate data transactions associated with the entity labeled by said beacon, wherein said beacon advertisement also includes an indication said beacon advertisement is of a type that includes both a semantic signature and an IPv6 address;

reception at a computing device of a beacon advertisement indicating the presence of an entity labeled by said beacon wherein said beacon advertisement contains information including both a semantic signature associated with an entity labeled by said beacon, and an IPv6 address assigned to facilitate data transactions associated with the entity labeled by said beacon, wherein said beacon advertisement also includes an indication said beacon advertisement is of a type that includes both a semantic signature and an IPv6 address;

interpretation by application software running on, or available to, said computing device that the received beacon advertisement is of a type whose information includes both a semantic signature associated with an entity labeled by said beacon, and an IPv6 address assigned to facilitate data transactions associated with the entity labeled by said beacon;

in response to said application software interpreting that the received beacon advertisement is of a type whose information includes both a semantic signature associated with an entity labeled by said beacon, and an IPv6 address assigned to facilitate data transactions associated with the entity labeled by said beacon, said application software compares said semantic signature included in said received beacon advertisement against said application software's dictionary of stored semantic signatures representing semantically defined concepts or entities previously determined to enable desired actions when an entity identified as being semantically equivalent, by virtue of sharing the same semantic signature, is discovered to be available to the user and/or computational device utilizing said application software;

if required by said application software to enable desired actions related to the discovery of the labeled entity, said IPv6 address associated with the labeled entity is utilized to facilitate any required data transaction/s.

8. The method of claim 7 wherein the semantic signature also incorporates a contextual index.

9. The method of claim 7 wherein the semantic signature may be changed reflecting a change of the state, context, or associated semantic concept of said entity.

10. The method of claim 7 wherein the labeled entity is intended to represent a plurality of entities.

11. The method of claim 7 wherein the IPv6 address is used to retrieve information.

12. The method of claim 7 wherein the IPv6 address is used to enable a transaction.

13. The method of claim 7 wherein the IPv6 address is used to assign new semantic signature and/or IPv6 address to the entity labeled by said beacon.

14. The method of claim 7 wherein the IPv6 address enables a means for providing situational learning re-enforcement to a Natural Language Processing application translating human semantic inputs into semantic signatures.

15. The method of claim 7 wherein the IPv6 address is used in common with one or more other beacons.

16. The method of claim 7 wherein the IPv6 address is used to facilitate collaboration between multiple labeled entities and/or software applications.

17. The method of claim 7 wherein the beacon advertisement utilizes the Bluetooth Special Interest Group (SIG) Bluetooth Low Energy Generic Access Profile (GAP) protocol.

18. The method of claim 7 wherein the IPv6 address data field is utilized to provide BLE GATT connection data for said beacon as indicated by the associated semantic signature.

* * * * *